United States Patent
Aldous et al.

(10) Patent No.: US 12,543,884 B2
(45) Date of Patent: Feb. 10, 2026

(54) REUSABLE BREW BASKET AND BREWING MACHINE ASSEMBLY

(71) Applicant: IB APPLIANCES US HOLDINGS LLC, Downers Grove, IL (US)

(72) Inventors: Tania Aldous, Niles, IL (US); Jason LePinske, Schaumburg, IL (US); Tyler Brunner, Durand, WI (US); Travis Harvey, Chicago, IL (US); Daniel M. Wodka, Riverside, IL (US)

(73) Assignee: IB APPLIANCES US HOLDINGS, LLC, Chicago, IL (US)

( * ) Notice: Subject to any disclaimer, the term of this patent is extended or adjusted under 35 U.S.C. 154(b) by 826 days.

(21) Appl. No.: 17/875,820

(22) Filed: Jul. 28, 2022

(65) Prior Publication Data

US 2023/0063053 A1    Mar. 2, 2023

Related U.S. Application Data

(60) Provisional application No. 63/241,887, filed on Sep. 8, 2021, provisional application No. 63/239,725, filed on Sep. 1, 2021.

(51) Int. Cl.
    A47J 31/06    (2006.01)
(52) U.S. Cl.
    CPC .............................. A47J 31/0689 (2013.01)
(58) Field of Classification Search
    CPC .............................. A47J 31/0689; A47J 31/06
    USPC ......... 99/340, 279, 300, 304, 306, 307, 315, 99/323
    See application file for complete search history.

(56) References Cited

U.S. PATENT DOCUMENTS

| | | | |
|---|---|---|---|
| 5,910,205 | A | 6/1999 | Patel |
| 7,032,503 | B2 | 4/2006 | Cai |
| 8,263,148 | B2 | 9/2012 | Yoakim et al. |
| 9,820,604 | B2 | 11/2017 | Banning et al. |
| 9,907,425 | B2 | 3/2018 | Rivera |
| 10,264,909 | B2 | 4/2019 | Hertaus |
| 2012/0052171 | A1 | 3/2012 | Starr et al. |
| 2012/0285330 | A1 | 11/2012 | Demiglio et al. |
| 2013/0055904 | A1 | 3/2013 | DeMiglio et al. |
| 2016/0367064 | A1* | 12/2016 | DeMiglio ............... A47J 31/06 |
| 2019/0313835 | A1 | 10/2019 | Valsecchi et al. |

(Continued)

FOREIGN PATENT DOCUMENTS

| | | |
|---|---|---|
| CN | 202875025 U | 4/2013 |
| CN | 103654411 A | 3/2014 |

(Continued)

OTHER PUBLICATIONS

International Preliminary Report on Patentability for International Patent Application No. PCT/US22/39001 dated Mar. 14, 2024, 19 pages.

(Continued)

*Primary Examiner* — Steven W Crabb
*Assistant Examiner* — Alba T Rosario-Aponte
(74) *Attorney, Agent, or Firm* — Crowell & Moring LLP

(57) ABSTRACT

A brew basket including a basket body having a side wall forming an interior and an opening at an upper edge of the basket body, and a lid having an elastomeric periphery sized and shaped to wipe a portion of the side wall proximate to the upper edge of the basket body when the lid moves between an open position and a closed position.

20 Claims, 8 Drawing Sheets

(56) References Cited

U.S. PATENT DOCUMENTS

| | | | |
|---|---|---|---|
| 2020/0245805 A1* | 8/2020 | DeMiglio | A47J 31/0689 |
| 2020/0397178 A1 | 12/2020 | Psarologos et al. | |
| 2021/0289978 A1* | 9/2021 | Kruger | A47J 31/0668 |
| 2022/0273130 A1* | 9/2022 | DeMiglio | A47J 31/0689 |

FOREIGN PATENT DOCUMENTS

| | | |
|---|---|---|
| CN | 209285079 U | 8/2019 |
| CN | 111166184 A | 5/2020 |
| CN | 211883434 U | 11/2020 |
| CN | 112690652 A | 4/2021 |
| DE | 1778023 U | 11/1958 |
| DE | 10 2010 048 514 A1 | 4/2012 |
| GB | 2569618 A | 6/2019 |
| JP | 2016202325 A * | 12/2016 |
| JP | 6507814 B2 | 5/2019 |
| TW | M531810 U | 11/2016 |
| WO | WO 2011/129687 A1 | 10/2011 |

OTHER PUBLICATIONS

Extended European Search Report issued in European Application No. 22865269.9 dated Apr. 15, 2025 (9 pages).

* cited by examiner

REUSABLE BREW BASKET AND BREWING MACHINE ASSEMBLY

RELATED APPLICATIONS

This application claims the benefit of U.S. Provisional Patent Application No. 63/239,725, filed on Sep. 1, 2021, and U.S. Provisional Patent Application No. 63/241,887, filed on Sep. 8, 2021, the entireties of which are incorporated herein by reference.

TECHNICAL FIELD

This disclosure relates to brew baskets, and particularly, relates to reusable brew baskets.

BACKGROUND

Capsule brewing machines are widely used nowadays; however, each capsule can be used only once, which creates a significant amount of plastic garbage. Following the concerns of consumers regarding environmental protection, reusable capsules were introduced to the market, which reduce the amount of trash otherwise caused by using disposable capsules. To use a reusable capsule, a user may need to fill the reusable capsule with the to-be-brewed ingredient. The reusable capsule is, therefore, not sealed by equipment in a factory. If a brew capsule is not sealed properly, the to-be-brewed ingredient, such as coffee grinds, may leak during the brewing process as pressurized water is injected into the brew capsule. The effort to clean brewing ingredients from a capsule that has leaded into a brewing machine significantly influences the user experience of the capsule brewing machine.

BRIEF SUMMARY

In one aspect, a brew basket includes a basket body having a side wall forming an interior and an opening at an upper edge of the basket body, and a lid having an elastomeric periphery sized and shaped to wipe a portion of the side wall proximate to the upper edge of the basket body when the lid moves between an open position and a closed position. A lid handle may extend from the lid. The lid handle may include a handle body and a first angled portion coupled between the lid and the handle body, wherein the first angled portion spaces the lid from the lid handle in a depth direction of the basket body, when the lid is in the closed position. A basket handle may extend from the basket body and may be positioned on a same side of the basket body as the lid handle, wherein the lid handle and the basket handle are engaged when the lid is in the closed position. At least one of the lid handle or the basket handle may include a fastener to removably fix the lid handle and the basket handle together when the lid is in the closed position. The basket handle may include a groove configured to receive the lid handle when the lid is in the closed position. The basket handle may further include a tooth positioned at an edge of the groove, with the tooth being configured to removably fix the lid handle in the groove of the basket handle when the lid is in the closed position. An end of the lid handle may protrude beyond an end of the basket handle at a side distant from the basket body. The lid handle may include a fastener at the end of the lid handle, with the fastener being configured to removably affix the lid handle to the basket handle.

In another aspect, a brew basket includes a basket body having a side wall forming an interior and an opening at an upper edge of the basket body, and a lid having a non-elastomeric first layer, having a first rigidity, and an elastomeric second layer, having a second rigidity lower than the first rigidity, wherein a periphery of the elastomeric second layer is configured to wipe a portion of the side wall proximate to the upper edge of the basket body when the lid moves between an open position and a closed position. The first layer may form a hole to receive a neck of the second layer. At least a portion of the second layer may sandwich a periphery of the hole. The second layer may form a channel within the hole of the first layer to receive a brewing head of a brewing machine. The second layer may surround the first layer. The second layer and the first layer may be co-planar when the lid is in the open position. The first layer may stack upon the second layer.

In another aspect, a brew basket include a basket body having a side wall forming an interior and an opening at an upper edge of the basket body, wherein a cross-sectional area of the basket body at the opening decreases in a depth direction of the basket body, and a lid having an elastomeric periphery sized and shaped to wipe a portion of the side wall proximate to the upper edge of the basket body when the lid moves between an open position and a closed position. A rate of decrease in the cross-sectional area at an upper portion of the basket body may be larger than a rate of decrease in the cross-sectional area at a lower portion of the basket body. The elastomeric periphery of the lid may be deformed when the lid is moved from the open position to the closed position. An area of the lid in the open position may be greater than a smallest portion of a cross-sectional area of the upper portion.

In another aspect, a brew basket includes a basket body having a side wall forming an interior and an opening at an upper edge of the basket body, and a lid having an elastomeric periphery sized and shaped to wipe a portion of the side wall proximate to the upper edge of the basket body when the lid moves between an open position and a closed position. A lid handle may extend from the lid. The lid handle may include a handle body and a first angled portion coupled between the lid and the handle body, wherein the first angled portion spaces the lid from the lid handle in a depth direction of the basket body. A basket handle may extend from the basket body and may be positioned on a same side of the basket body as the lid handle, wherein the lid handle and the basket handle are engaged when the lid is in the closed position. At least one of the lid handle or the basket handle may include a fastener to removably fix the lid handle and the basket handle together when the lid is in the closed position. The basket handle may include a groove configured to receive the lid handle when the lid is in the closed position. The basket handle may further include a tooth positioned at an edge of the groove, the tooth being configured to removably fix the lid handle in the groove of the basket handle when the lid is in the closed position. An end of the lid handle may protrude beyond an end of the basket handle at a side distant from the basket body. The lid handle may include a fastener at the end of the lid handle, the fastener being configured to removably affix the lid handle to the basket handle. The fastener may utilize a snap fit.

In another aspect, a thickness of the end of the basket handle distant from the basket body may gradually decreases along a direction away from the basket body. The fastener may be of a unitary construction with the lid handle. The fastener may receive the end of the basket handle distant from the basket body. The fastener may be bent to release the end of the basket handle distant from the basket body.

In another aspect, the lid may include a non-elastomeric first layer, having a first rigidity, and an elastomeric second layer, having a second rigidity lower than the first rigidity. The second layer may be sized and shaped to form the elastomeric periphery extending beyond the first layer. The first layer may have a fastener to affix the second layer with the first layer. The first layer may form a hole to receive a neck of the second layer. At least a portion of the second layer may sandwich a periphery of the hole. The second layer may form a channel within the hole of the first layer to receive a brewing head of a brewing machine. The second layer may surround the first layer. The second layer and the first layer may be co-planar when the lid is in the open position. The first layer may stack upon the second layer.

In another aspect, a lid handle may extend from the lid, wherein the lid handle and the first layer of the lid are of a unitary construction. A hinge may be positioned opposite the lid handle, and a second angled portion may extend toward the hinge from the lid, wherein the lid is pivotable about the hinge between the open position and the closed position. The hinge may include a slit configured to receive a flange extending from the second angled portion. The flange may extend upwardly. The second angled portion may include a crest elevated from the lid. The flange and the crest may define a valley between the flange and the crest, and a portion of the basket body may be positioned above the valley.

In another aspect, the lid may have a non-elastomeric inner portion surrounded by the elastomeric periphery.

In another aspect, a diameter of the basket body at the opening may decreases in a depth direction of the basket body. A cross-sectional area of the basket body may decrease in a depth direction of the basket body. A rate of decrease in the cross-sectional area at an upper portion of the basket body may be larger than a rate of decrease in the cross-sectional area at a lower portion of the basket body.

In another aspect, the elastomeric periphery of the lid may be deformed when the lid is moved from the open position to the closed position.

In another aspect, a mesh filter may be formed in the side wall, wherein the mesh filter is spaced apart from an upper portion of the side wall proximate to the upper edge.

In another aspect, an area of the lid in the open position is greater than a smallest portion of a cross-sectional area of the upper portion. An area of the lid in the open position may be greater than an area of the lid in the closed position.

In another aspect, an indicator may be configured to indicate the presence of the brew basket. The indicator may include a magnet. A lid handle may extend from the lid, and a basket handle may extend from the basket body, wherein the magnet may be configured to attract the lid handle toward the basket handle. The magnet may be situated underneath the basket handle. A basket handle may extend from the basket body, wherein the basket handle may include a compartment configured to the house the indicator.

In another aspect, a brew basket may include and any one or more of the features above.

In another aspect, a brew basket includes a basket body having a side wall forming an interior and an opening at an upper edge of the basket body, and a lid movable between an open position and a closed position to close the basket body, wherein an upper surface of the lid is positioned in the interior when the lid is in the closed position. A lid handle may extend from the lid and include a handle body, and an angled portion positioned between the lid and the handle body of the lid handle, wherein the angled portion spaces apart the lid and the handle body of the lid handle in a depth direction of the basket body. The lid may be positioned at a lower position than the lid handle in the depth direction of the basket body when the lid closes the basket body. A basket handle may extend from the basket, wherein the basket handle is configured to receive the lid handle. The lid may be detachable from the basket body. The lid may form a close fit with the side wall of the basket body. A periphery of the lid may be deformed when the lid is in the closed position. An inner portion of the lid may have a rigidity higher than a rigidity of the periphery.

In another aspect, the basket body may include a notch at a bottom of the basket body.

In another aspect, a thickness of a periphery of the lid may be less than a thickness of an inner portion of the lid. A thickness of an intermediate portion of the lid between the periphery of the lid and the inner portion of the lid may be greater than the thickness of an inner portion of the lid and the thickness of the periphery of the lid.

In another aspect, a brew basket may include and any one or more of the features above.

In another aspect, a brewing machine assembly may include a brew basket having any one or more of the features above, a brewing chamber for housing the brew basket and performing a brewing process, and a cap configured to cap the brewing chamber, wherein the handle of the brew basket extends beyond the brewing chamber when the brewing chamber is capped by the cap.

DESCRIPTION

Figure 1A:
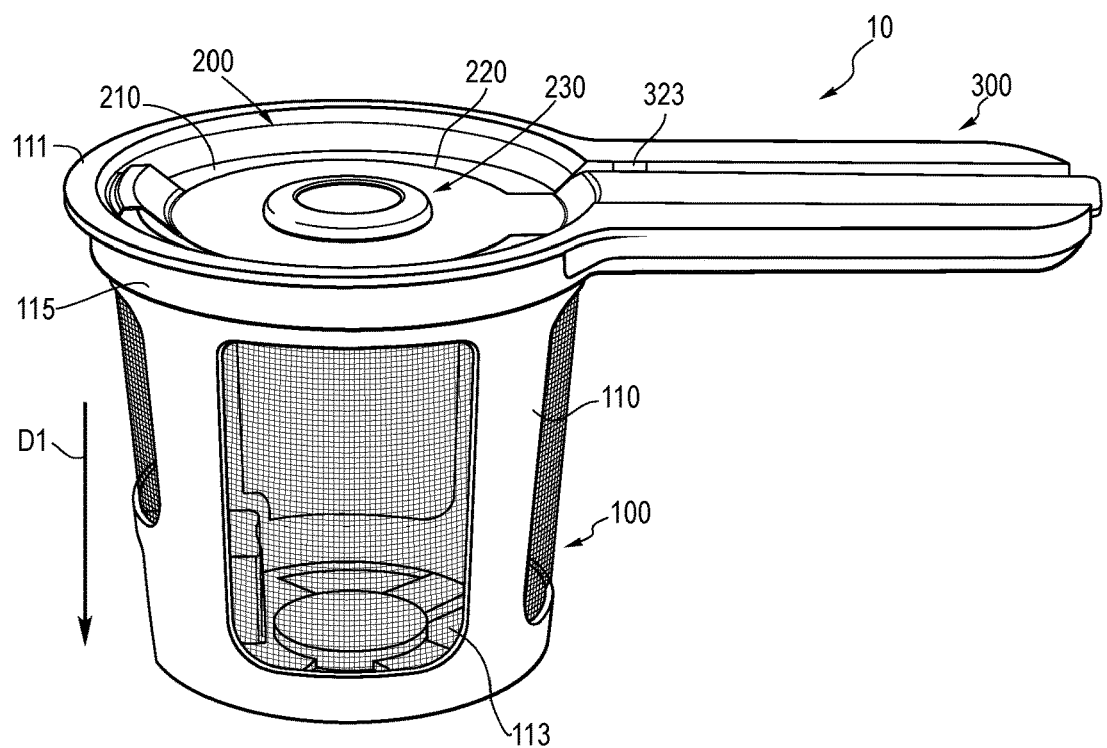
FIGS. 1A-D show an embodiment of a brew basket of this disclosure.
Figure 1B:
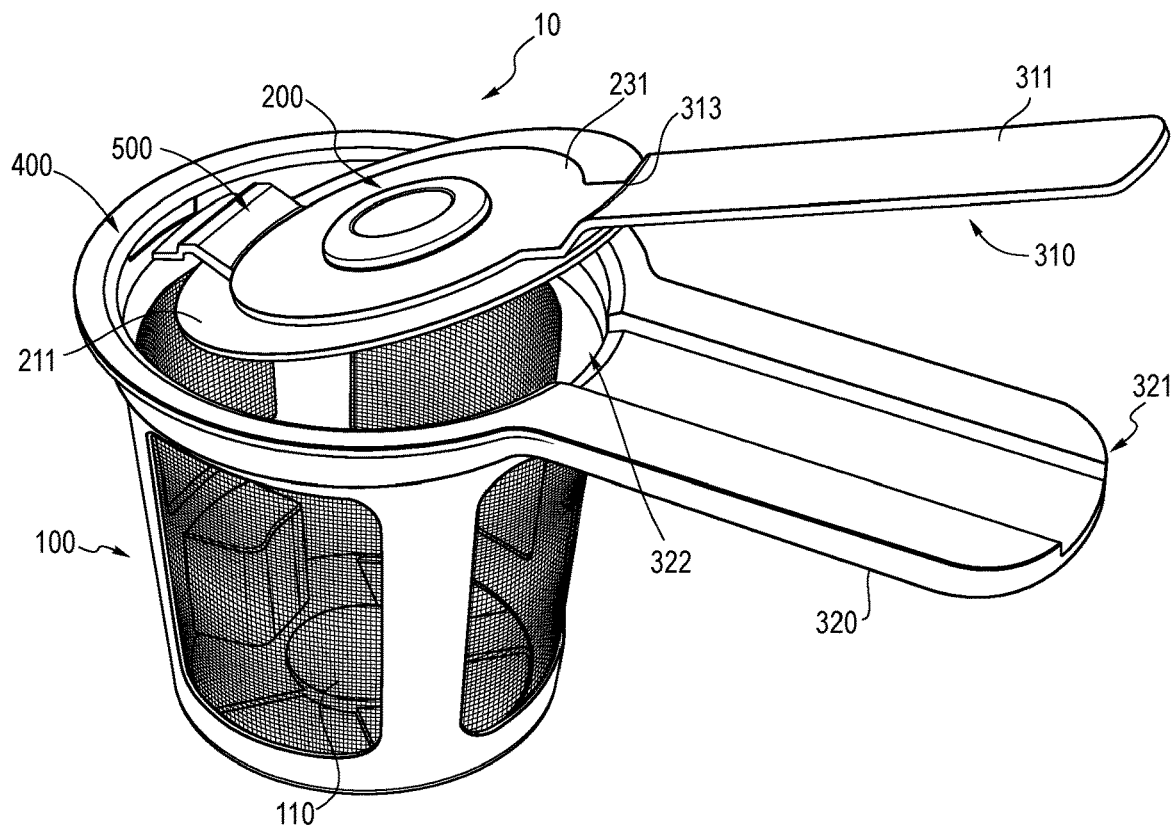

FIG. 1A shows an embodiment of a brew basket of this disclosure. The brew basket 10 includes a basket body 100 and a lid 200. The basket body 100 includes a side wall 110 forming an interior and an opening at an upper edge 111 of the basket body 100. The lid 200 may have an elastomeric periphery 210. The elastomeric periphery 210 is sized and shaped to wipe a portion, such as an upper portion 115, of the inner side of the side wall 110 proximate to the upper edge 111 of the basket body 100 when the lid 200 moves between an open position (as shown in FIG. 1B) and a closed position (as shown in FIG. 1A). When the lid 200 is in the closed position, an upper surface 220 of the lid 200 is positioned in the interior of the basket body 100. In other words, the upper surface 220 of the lid 200 is lower than the upper edge 111 of the basket body 100 when the lid 200 is in the closed position.

Specifically, the lid 200 can move between the closed position and the open position. When the lid 200 moves from the open position to the closed position (for example, transitioning from the status of FIG. 1B to FIG. 1A), the lid 200 would move at least roughly along a depth direction D1 of the basket body 100. During the movement, the elastomeric periphery 210 touches the interior of the side wall 110 and wipes the interior of the side wall 110 of the basket body 100. If there is residual brewing ingredients (not shown), such as tea powder, chocolate powder, or coffee grinds, stuck on the upper portion 115 of the side wall 110, the lid 200 may wipe the ingredients from the side wall 110 toward a lower portion of the basket body 100. This mechanism may reduce or eliminate ingredients lodged between the edge of the lid 200 and the side wall 110 of a basket body 100, which may otherwise cause poor closure of the basket body 100 and/or lead to leakage of the pressurized liquid injected into the brew basket body 100, along with the brewing ingredients located therein. In this way, user experience is thereby increased.

In an exemplary implementation, the lid 200 has elastomeric periphery 210. The elasticity of the lid 200 improves contact by the lid 200 with the inner side wall 110. The elastomeric periphery 210 can be made of silicone, for example, or other material having rigidity less than an inner portion 230 of the lid 200. The inner portion 230 of the of the lid 200 can be made of metal, for example, and may be surrounded by the elastomeric periphery 210. Alternatively, the inner portion 230 may be made of plastic material. The basket body 100 may be made of plastic material, such as Polypropylene, Polyetherimide (PEI), Polyether ether ketone (PEEK), and/or Polytetrafluoroethylene (PTFE).

In some exemplary implementations, the elastomeric periphery 210 is deformed when it contacts with the side wall 110 because the size of the lid 200 may be slightly larger than the cross-sectional area of the upper portion 115 of the basket body 100. In other words, in generally circular embodiments, as illustrated in FIGS. 1-3, an outer diameter of the lid 200 may be slightly larger than an inner diameter of the upper portion 115 of the basket body 100. Additionally, an area of the lid 200 in the open position is greater than a smallest portion of the cross-sectional area of the upper portion 115 devoid of a mesh filter 113. Thus, when the lid 200 is in the closed position, the lid 200 may be deformed (as shown in FIG. 2A), and the area of the lid 200 decreases due to the deformation, such that the area of the lid 200 in the open position is greater than an area of the lid 200 in the closed position. The elastomeric periphery 210 may therefore form a close and/or compression fit with the side wall 110 at least at certain contact points. When the lid 200 is positioned at the closed position, the lid 200 may fully close the opening of the basket body 100, and thereby prevent the to-be-brewed ingredients from leaking from the interior of the basket body 100. In some implementations, because the elastomeric periphery 210 provides a better fit with the side wall 110, as compared to prior brew baskets, the ingredients can be wiped downward more efficiently and thoroughly after a user finishes filling the to-be-brewed ingredients in the basket body 100.

Figure 2A:
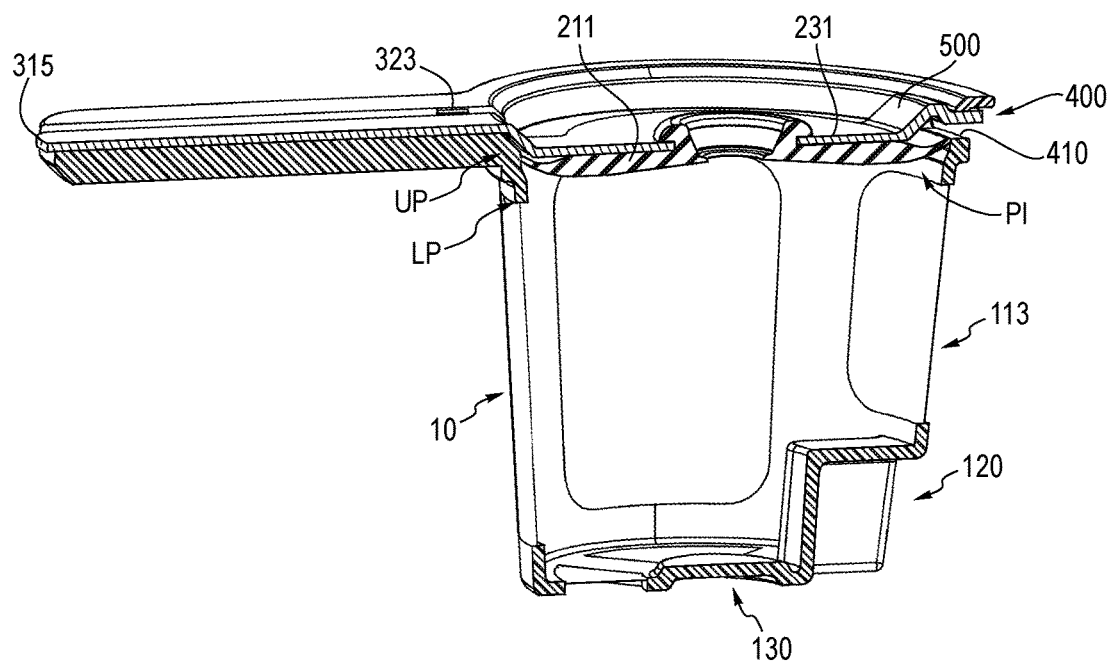
FIGS. 2A-C show cross sectional views of the brew basket of FIGS. 1A-D.
Figure 2B:
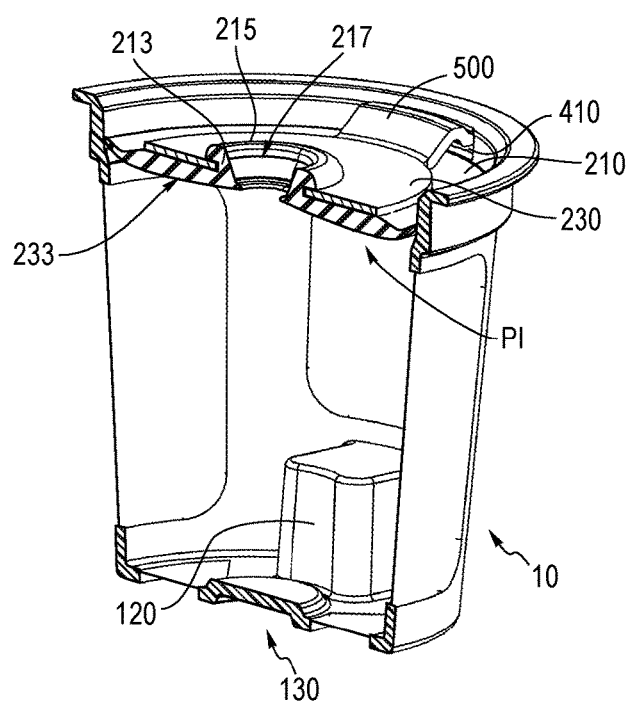

In one exemplary implementation as shown in FIG. 2A, a cross-sectional area in a horizontal direction of the basket body 100 decreases gradually in the depth direction D1 of the basket body 100. If the basket body 100 is generally circular, a diameter of the basket body 100 decreases in the depth direction D1 of the basket body 100. When a user pushes the lid 200 downwardly toward the depth direction D1 of the basket body 100, the lid 200, particularly the periphery 210 of the lid 200, is deformed gradually. That is, the periphery 210 will have greater deformation as the lid 200 is pushed downwardly along the depth direction D1 of the basket body 100, as the diameter of the basket body 100 decreases. Further, in an exemplary implementation, a rate of decrease in the cross-sectional area at an upper portion of the basket body 100 is different (or larger as an example) than a rate of decrease in the cross-sectional area at a lower portion of the basket body 100 as shown in FIGS. 2A-B. For example, the cross-sectional area at the UP portion decreases more rapidly that the cross-sectional area at the LP portion.

Figure 2C:
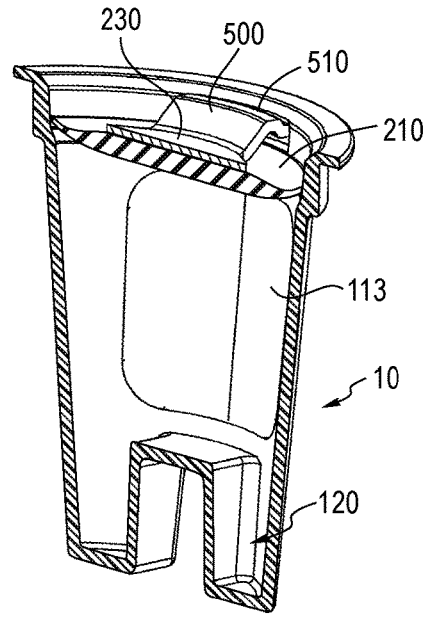
Figure 3A:
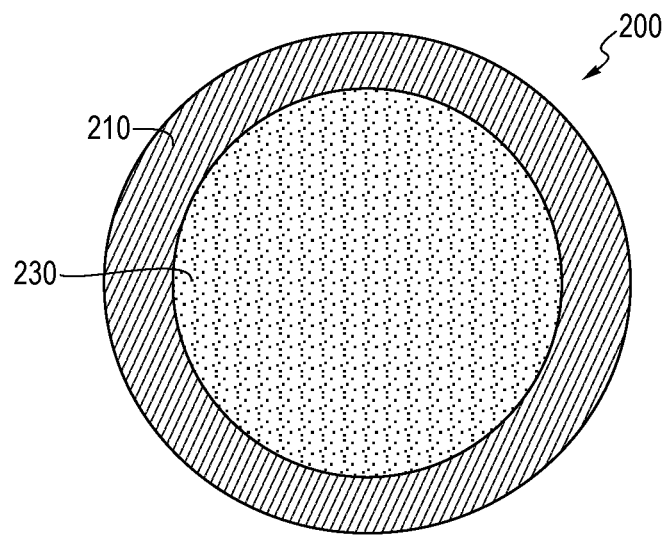
FIGS. 3A-C show other embodiments of lids of a brew basket of this disclosure.
Figure 3B:
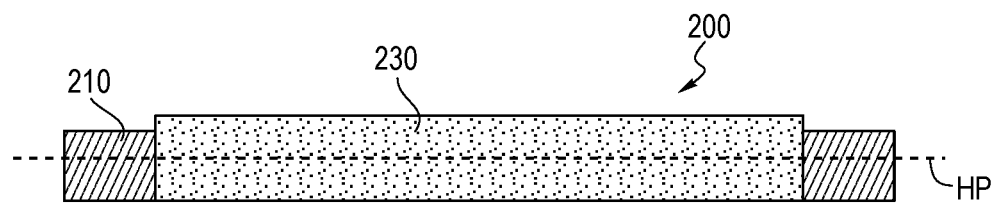
Figure 3C:
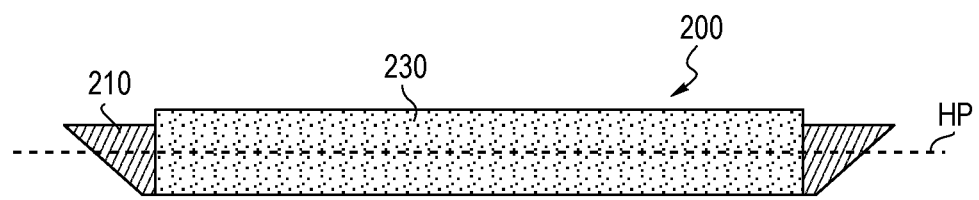

In some exemplary implementations of the lid 200, the elastomeric periphery 210 may be co-planar with the inner portion of the lid 200 as shown in FIGS. 3A-C, wherein FIGS. 3B and 3C are cross-sectional views of exemplary embodiments of FIG. 3A. In this exemplary implementation, the inner portion 230 of the lid 200 is surrounded by the elastomeric periphery 210 at the same level, while the inner portion 230 of the lid 200 may have a different thickness from the thickness of the elastomeric periphery 210. That is, at least a portion of the elastomeric periphery 210 and at least a portion of the inner portion 230 lie in the same horizontal plane HP (the dashed line in FIGS. 3B and 3C) as compared to the stacked elastomeric periphery 210 and inner portion 230 in FIGS. 2A to C. The elastomeric periphery 210 can be attached to the inner portion 230 of the lid 200 with its own elasticity. For example, the elastomeric periphery 210 can be an elastic ring that attaches to the inner portion 230. In other embodiments, the elastomeric periphery 210 may be attached to the inner portion 230 with an adhesive. The inner portion 230 of the lid 200 can be made of a different material from the material of the elastomeric periphery 210 of the lid 200. For example, the inner portion 230 of the lid 200 can be made of metal, such as stainless steel, or a plastic material, while the elastomeric periphery 210 can be made, for example, of silicone.

In an exemplary implementation as shown in FIGS. 2A-C, the lid 200 may include a non-elastomeric first layer 231 and an elastomeric second layer 211 stacked upon each other. So that the elastomeric second layer 211 extend beyond the non-elastomeric first layer 231, the area of the elastomeric second layer 211 may be larger than the area of the non-elastomeric first layer 231. Further, if the lid 200 is circular or generally circular, the diameter of the elastomeric second layer 211 may be larger than the diameter of the non-elastomeric first layer 231. The portion of the elastomeric second layer 211 extending beyond the non-elastomeric first layer 231 may serve as the elastomeric periphery 210, described above.

Exemplarily, the non-elastomeric first layer 231 and/or the elastomeric second layer 211 may have fastener(s) to engage the non-elastomeric first layer 231 and the elastomeric second layer 211 together. In one exemplary implementation, the non-elastomeric first layer 231 may form a hole 233 (as shown in FIG. 2B), and the elastomeric second layer 211 may have a neck 213 (as shown in FIG. 2B). The hole 233 of the non-elastomeric first layer 231 is configured to receive the neck 213 of the elastomeric second layer 211. Further, the elastomeric second layer 211 may sandwich a part of the non-elastomeric first layer 231 between a lip 215 over the non-elastomeric first layer 231, and a main body of the elastomeric second layer 211 below the non-elastomeric first layer 231.

Figure 4:
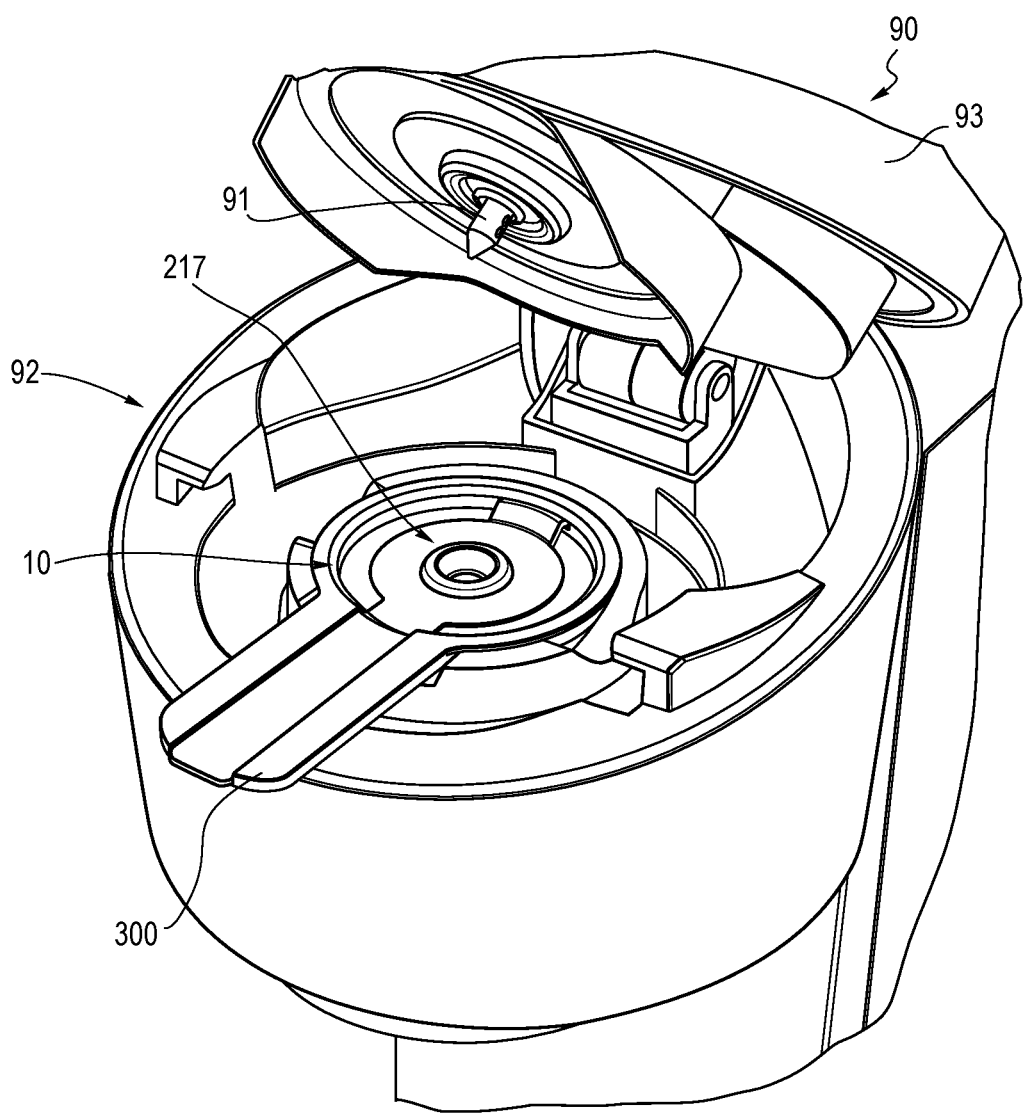
FIG. 4 shows a brewing machine assembly according to an embodiment of this disclosure.

Exemplarily, the elastomeric second layer 211 may form a channel 217 (as shown in FIG. 2B) to receive pressurized liquid provided by a brewing head 91 (as shown in FIG. 4) of a brewing machine 90, so that the liquid, such as hot water, can enter the brew basket 10 via the channel 217. The channel 217 of the elastomeric second layer 211 may be positioned at least partially within the hole 233 of the non-elastomeric first layer 231. The channel 217 may be elastomeric and sized and shaped to receive the brewing head 91 of the brewing machine 90. The width of the channel 217 may decrease gradually along the depth direction D1 of the basket body 100.

In one exemplary implementation as shown in FIGS. 2A-C and 3C, the lid 200 may have different thicknesses at different portions. For example, the periphery 210 of the lid 200 may be thinner than an inner portion 230 of the lid 200. This exemplary implementation is compatible with the embodiments where the inner portion 230 of the lid 200 is either co-planar with the periphery 210 of the lid 200 (as shown in FIG. 3C) or stacks upon the periphery 210 of the lid 200 (as shown in FIGS. 2A to C). The thickness of the periphery 210 can decrease gradually along a direction extending outward from the inner portion 230 of the lid 200. The lid 200 may have a largest thickness at an intermediate portion PI (as shown in FIG. 2A) between a center of the lid 200 and the periphery 210. The boundary of the intermediate potion PI aligns or at least roughly aligns with an edge of the non-elastomeric first layer 231. The thickness of the lid 200 may decrease toward either sides of the intermediate potion PI.

Turing to other structures of the brew basket 10, the brew basket 10 may further include a handle 300 connected to the basket body 100. The handle 300 may extend beyond a brewing chamber 92 of a brewing machine 90, as shown in FIG. 4, to a location where a user may grip the handle 300 without coming in to close contact with brewing chamber 92 and/or surfaces or contents contained therein (e.g., heat, steam, moisture, etc.). Further, the handle 300 allows a user to hold the handle 300 to use the brew basket 10 as a scoop to scoop brewing ingredients from a container, for example coffee or tea grounds.

In one exemplary implementation, a lid handle 310 extends from the lid 200. The lid handle 310 and the first layer 231 of the lid 200 may be of a unitary construction. The lid handle 310 includes a handle body 311 and a first angled portion 313 coupled between the lid 200 and the handle body 311. The first angled portion 313 spaces the lid 200 from the lid handle 310 in the depth direction D1 of the basket body 100. As shown in FIGS. 1A and B, the lid handle 310 is positioned at a higher level than the lid 200 when the lid 200 is in the closed position. The first angled portion 313 creates such difference along the depth direction D1 of the basket body 100. Therefore, when the lid handle 310 is situated in the basket handle 320, the lid 200 is positioned within the interior of the basket body 100 along the depth direction D1, which allows the lid 200 to wipe the upper portion 115 of the side wall 110.

Figure 1C:
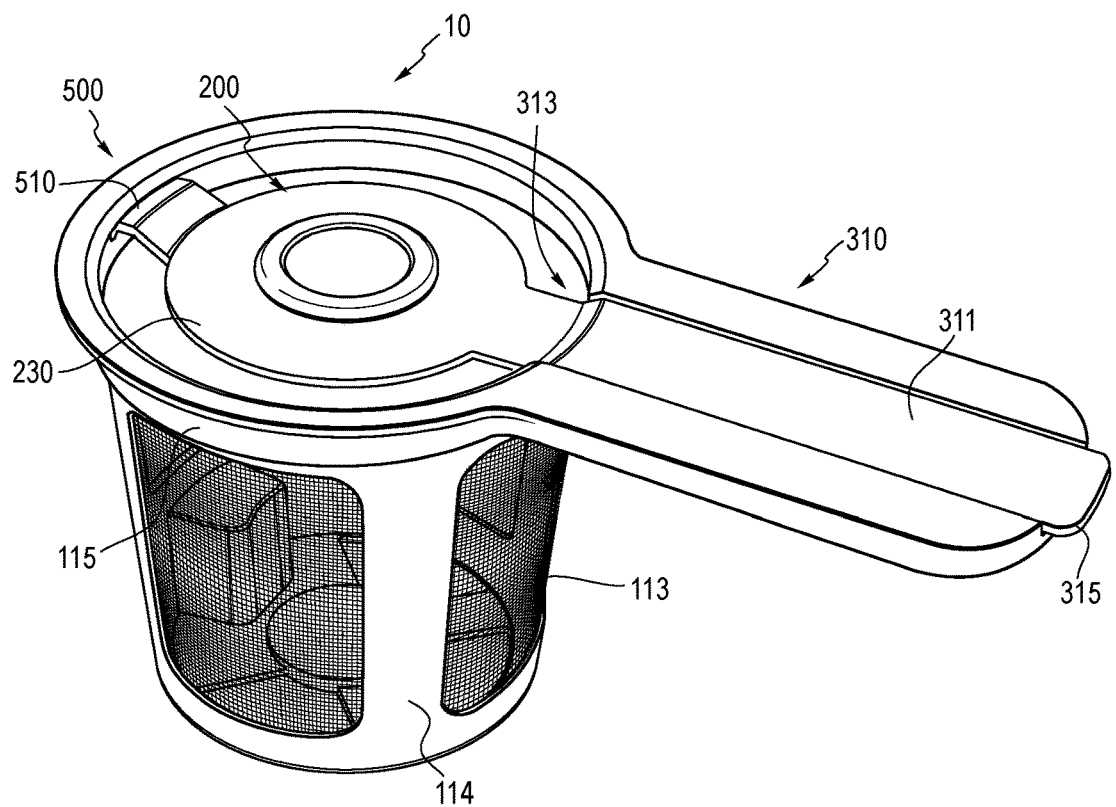

Further, the brew basket 10 may exemplarily include a basket handle 320 extending from the basket body 100 and positioned at the same side of the basket body 100 as the lid handle 310, as shown in FIGS. 1A-D. The lid handle 310 and the basket handle 320 are engaged with each other when the lid 200 is in the closed position. As shown in FIG. 2A, the thickness of the basket handle 320 may be greater than the thickness of the lid handle 310. Exemplarily, the basket handle 320 may include a groove 321 on the basket handle 320. The groove 321 is configured to receive the lid handle 310 when the lid 200 is in the closed position. The groove 321 forms a connection point 322 between the opening of the basket body 100 and the basket handle 320, and the groove 321 may extend along the longitudinal axis of the basket handle 320. In one exemplary implementation, the groove 321 reaches the end of the basket handle 320 distant from the basket body 100. That is, the groove 321 may extend the entire basket handle 320. When the lid 200 is in the closed position and when the lid handle 310 is received by the groove 321, the lid handle 310 may extend beyond the end of the basket handle 320 distant from the basket body 100 as shown in FIG. 1C. Therefore, a protrusion 315 of the lid handle 310, distant from the basket body 100 and extending beyond the groove 321, can be used by a user to separate the lid handle 310 and the basket handle 320.

In one exemplary implementation, at least one of the lid handle 310 or the basket handle 320 includes a fastener, such as a tooth 323 (as shown in FIG. 1A) to removably fix the lid handle 310 and the basket handle 320 together when the lid 200 is in the closed position. For example, the basket handle 320 may further include the tooth 323 positioned at an edge of the groove 321. The tooth 323 is configured to removably fix the lid handle 310 in the groove 321 of the basket handle 320 when the lid 200 is in the closed position. Specifically, the tooth 323 can prevent the lid handle 310 from arbitrarily moving out of the groove 321, but if sufficient force is applied on the lid handle 310, the lid handle 310 can overcome the resistance of the tooth 323 and be moved out of the groove 321. Optionally, the tooth 323 is positioned proximate to the basket body 100, such that the length of the lid handle 310 can provide leverage for the user to overcome the resistance of the tooth 323, and facilitate the removal of the lid handle 310 from the groove 321.

As described above, the lid 200 is movable between the open position and the closed position. The lid 200 may be detachable from the basket body 100, such that the basket body can serve like a scoop. In one exemplary implementation, as shown in FIGS. 1A-B, the lid 200 pivots about a point of the basket body 100. For example, the brew basket 10 may include a hinge 400 positioned opposite to the handle 300. The lid 200, therefore, can pivot about the hinge 400 to move between the open position and the closed position. The hinge 400 can be different types of hinges, such as a living hinge. The lid 200 may be detachable from the hinge 400. For example, the hinge 400 may include a slit 410, which can receive a flange 420 extending from the lid 200 (or from a second angled portion 500) to form the hinge 400.

Exemplarily, the brew basket 10 may further comprise a second angled portion 500 extending roughly toward the hinge 400 from the lid 200. The second angled portion 500 is positioned between the hinge 400 and the lid 200. The second angled portion 500 spaces the hinge 400 and the lid 200 apart along a depth direction D1 of the basket body 100, such that the lid 200 is positioned below the hinge 400 or slit 410 in the depth direction D1, when the lid 200 is in the closed position. In an exemplary implementation, the second angled portion 500 and the lid 200 (such as the non-elastomeric first layer 231 of the lid 200) are of unitary construction (as shown in FIG. 1C). For example, they can be made of a same metal piece. Further, the second angled portion 500 may be, for example, a curved structure and have an intermediate crest 510, which is positioned higher than the slit 410 and the lid 200 when the lid 200 is in the closed position.

It should be noted that, depending on the various movement paths of the lid 200, a certain portion of the lid 200 may engage with the inner side wall 110 earlier than the other portions of the lid 200 during the movement. For example, as shown in FIG. 1B in which the lid 200 pivots about the hinge 400, the periphery 210 of the lid 200 proximate to the hinge 400 may touch the side wall 110 of the basket body 100 first. Then the other portion of the periphery 210 will sequentially touch and wipe the side wall 110 of the basket body 100. On the other hand, if the movement of the lid 200 is not pivotal about the hinge 400, but instead, is a movement parallel to the depth direction D1 of the basket body 100, the periphery 210 around the lid 200 may touch the side wall 110 at approximately the same time.

Figure 1D:
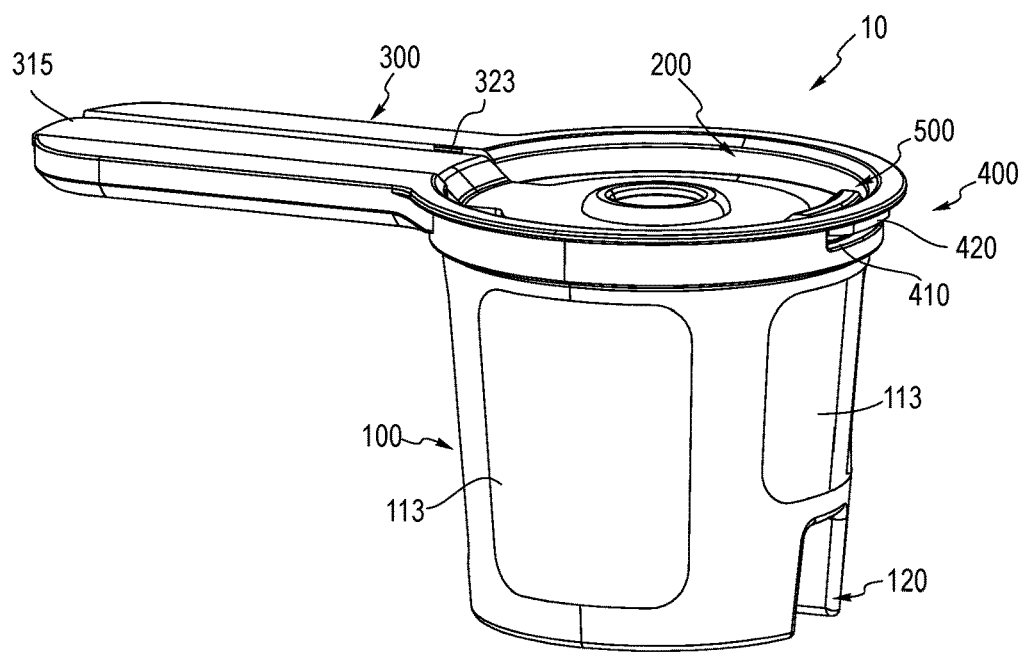

As shown in FIGS. 1C-D, the side wall 110 of the basket body 100 may include a filter, such as a mesh filter 113, and one or more ribs 114 may be configured between one or more mesh filters 113. The mesh filter 113 allows liquid injected into the basket body 100 to exit the basket body 100, but stops larger grounds of the brewed ingredients from existing the basket body 100. The mesh filter 113 may be spaced apart from the upper edge 111 of the basket body 100, such that the upper portion 115 of the side wall 110 of the basket body 100 is devoid of the mesh filter 113. At least a part of the upper portion 115 devoid of the mesh filter 113 will be wiped by the periphery 210 of the lid 200 as the lid is moved from an open position to a closed position.

As shown in FIGS. 2A-B, the basket body 100 may include a side notch 120 at the lower portion of the side wall 110 of the basket body 100. The side notch 120 may be positioned on the basket body 100 opposite to the basket handle 320. Correspondingly, the brewing machine 90 may have a protrusion (not shown) positioned into the side notch 120 when the brew basket 10 is positioned in the brewing chamber 92 of the brewing machine 90. Further, the basket body 100 may include a bottom notch 130 positioned at the bottom of the basket body 100. Correspondingly, the brewing machine 90 may have another protrusion (not shown) positioned into the bottom notch 130 when the brew basket 10 is positioned in the brewing chamber 92 of the brewing machine 90. The notch 120 leaves a space for a needle (not shown) of the brewing machine 90. Specifically, when a disposable capsule is installed into the brewing chamber 92 of the brewing machine 90, the brewing machine 90 may use a needle to puncture the disposable capsule such that the water injected into the disposable capsule can flow out. When using the brew basket 10, the brew basket 10 has the mesh filter 113 to allow the water therein to flow out. Thus, the puncturing of the needle is not necessary, and the notch 120 may leave a space for the needle of the brewing machine 90. In one implementation, the brewing machine 90 can tell what kind of brew baskets is installed and run different brewing process accordingly.

Figure 5A:
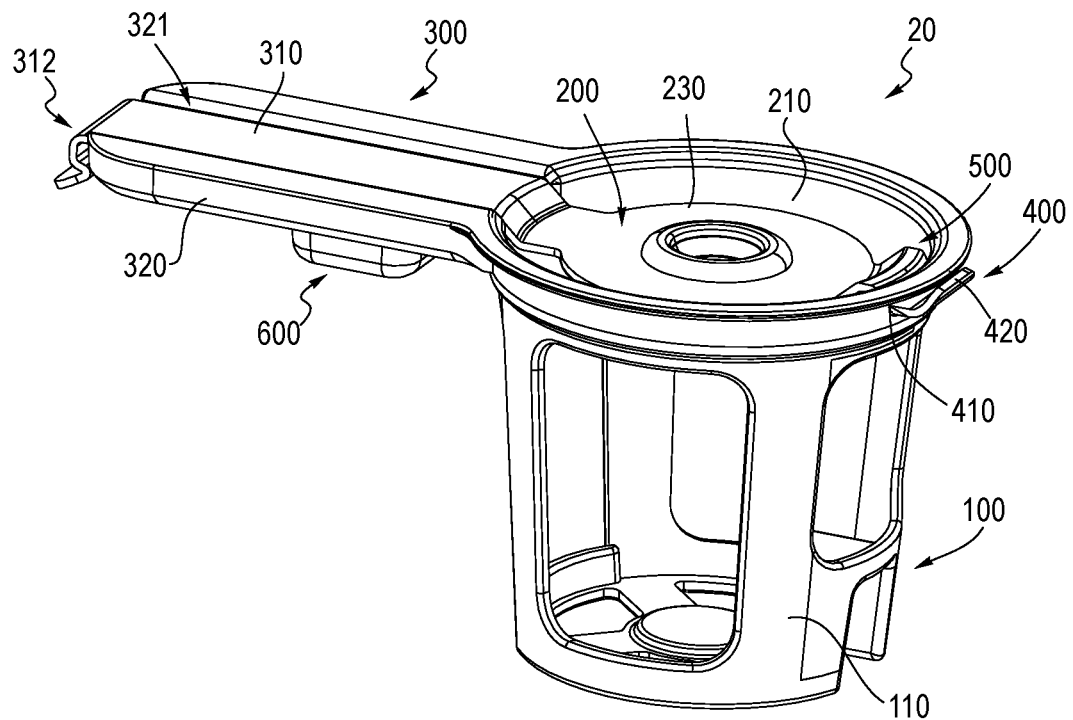
FIG. 5A shows another embodiment of a brew basket of this disclosure.
Figure 5B:
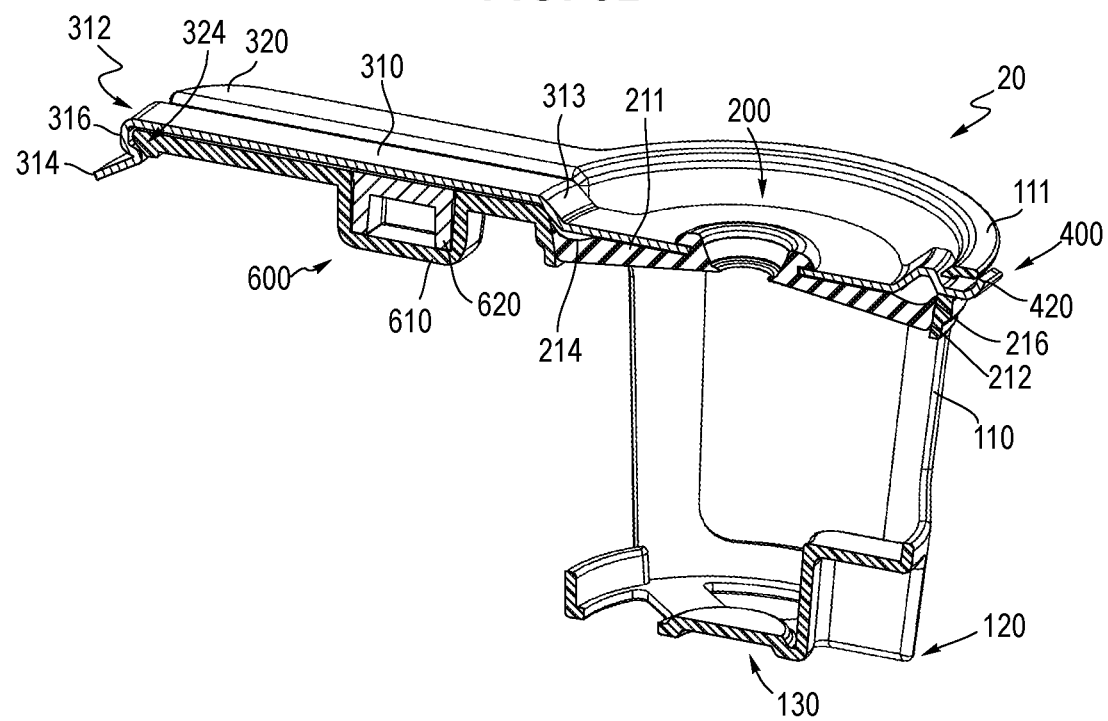
FIG. 5B shows a cross-sectional view of the brew basket of FIG. 5A.
Figure 5C:
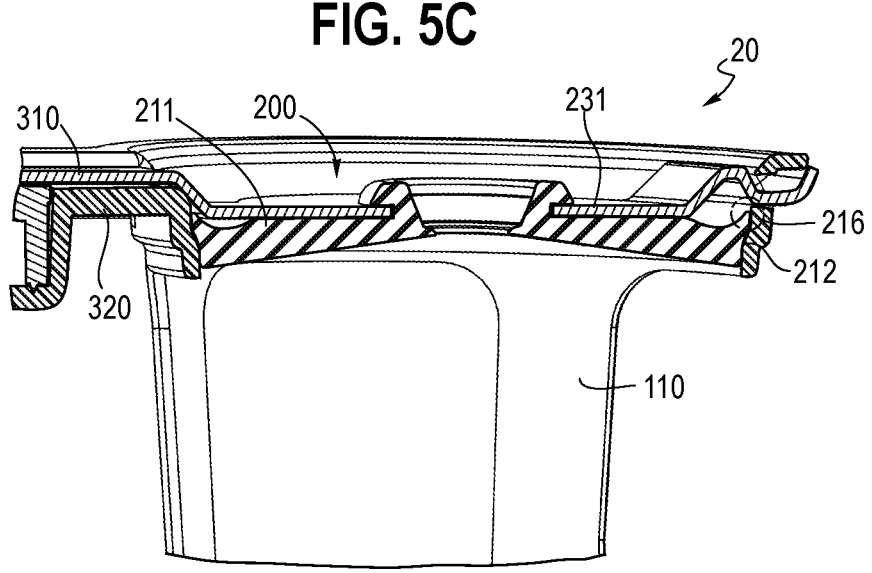
FIG. 5C shows an enlarged cross-sectional view of the brew basket of FIG. 5A.
Figure 5D:
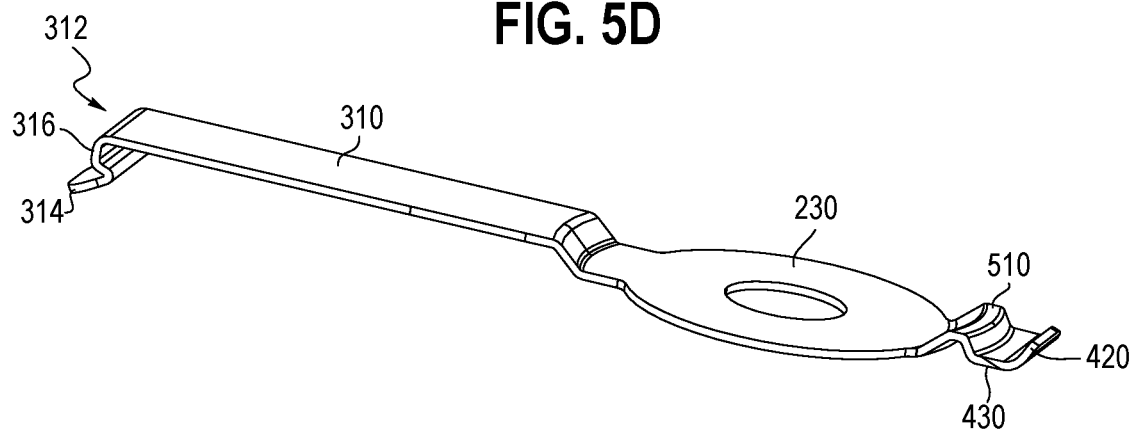
FIG. 5D shows an exemplary lid, handle, and other portions of the brew basket of FIG. 5A.
Figure 5E:
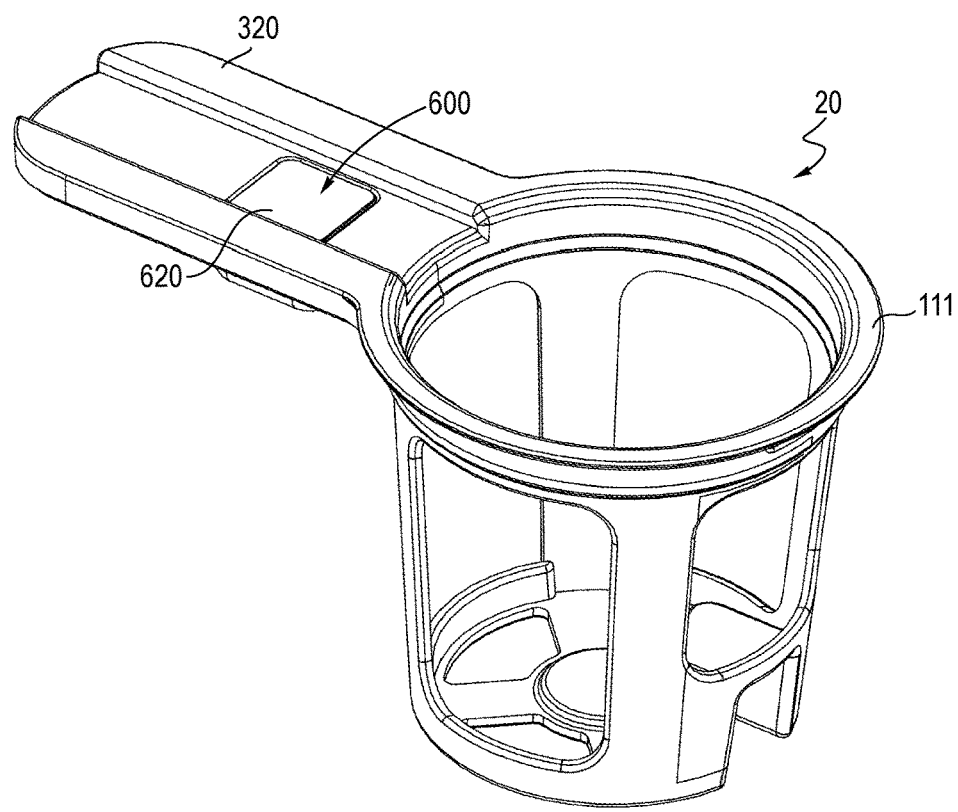
FIG. 5E shows an exemplary basket body and basket handle of the brew basket of FIG. 5A.
Figure 5F:
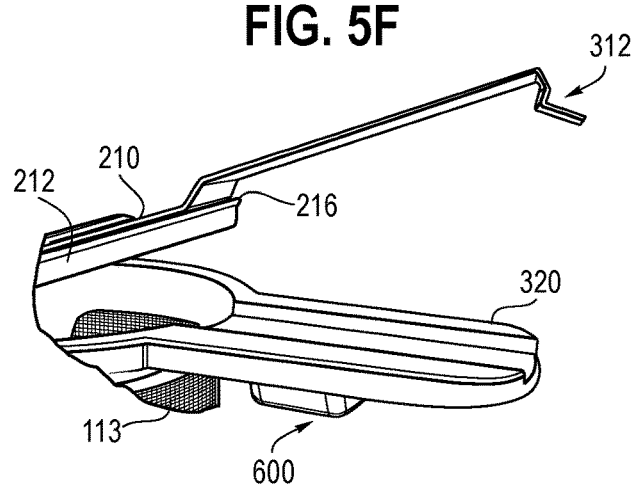
FIG. 5F shows a portion of the brew basket of FIG. 5A.

FIGS. 5A-F show another embodiment of a brew basket 20 of this disclosure. FIG. 5B is a cross-sectional view of the brew basket 20, while FIGS. 5C-F show parts of the brew basket 20. The brew basket 20 has the same or similar structures and/or functions with the brew basket 10, so unless explained otherwise below, the above description and implementations corresponding to FIGS. 1-3 are applicable to the brew basket 20. For clarification, the side wall 110 of the basket body 100 may include a mesh filter 113 (as shown in FIG. 5F), but the mesh filter 113 is omitted in FIGS. 5A, B, C and D.

Exemplarily, the brew basket 20 has a fastener 312 situated at the end of the lid handle 310 distant from the basket body 100. The fastener 312 can removably affix the lid handle 310 and the basket handle 320 together, for example, to situate the lid handle 310 in the groove 321 of the basket handle 320. As an example, the fastener 312 may be a snap fit, including a curved portion 316 contoured, at least partially, with the end of the basket handle 320, and a flange 314 extending from the curved portion 316. The snap fit may be in an S-shape as shown in FIGS. 5B and D. The curved portion 316 receives the end of the basket handle 320, and the curved portion 316 may sandwich or surround a portion of the end of the basket handle 320. When the lid 200 is in the closed position, the fastener 312, such as the curved portion 316, and the structures located at the other side of the basket handle 320 may help anchor the position of the lid handle 310 and the lid 200. For example, the curved portion 316 receives one end of the basket handle 320, and the first angled portion 313 may contact or engage to the other end of the basket handle 320. Further, the flange 420 may help anchor the lid, and thereby the lid handle 310, at the opposite end to the curved portion 316, because the flange 420 is inserted into the slit 410. Likewise, the lid 200, such as the elastomeric second layer 211 positioned in and engaged with the basket body 110, may also anchor the lid handle 310 when the lid handle 310 is coupled to the elastomeric second layer 211 via the non-elastomeric first layer 231. The flange 314 provides a place for a user to apply force to release and/or set the snap fit engagement. Specifically, the snap fit may be bendable, so when a user applies force upwardly, the curved portion 316 may be bent away from the end of the basket handle 320 to release the end of the basket handle 320 from the curved portion's 316 concave. Therefore, the engagement between the basket handle 310 and the fastener 312 (the snap fit) can be released. To cooperate with the fastener 312, the thickness of the end of the basket handle 320 distant from the basket body 100 may decrease gradually in a direction away from the basket body 100. The basket handle 320 may form a slope 324 at the end of the basket handle 320 for the thickness change. The slope 324 may face downwardly, and the slope 324 may be at least partially received by the curved portion 316. The implementations of the fastener 312 and the structure at the end of the basket handle 320 here can also be applied to the brew basket 10 described in FIGS. 1-3.

Figure 6:
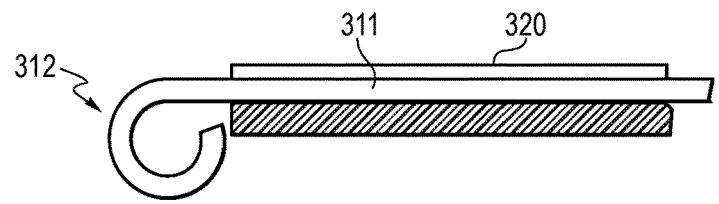
FIG. 6 shows another implementation of the lid handle of the FIG. 5A.

Alternatively, FIG. 6 shows another implementation of the fastener 312. In this implementation, the fastener 312 also forms a snap fit. Specifically, when the handle body 311 moves toward the basket handle 320, a curved portion of the fastener 312 is bent toward the center of the curvature to form a snap fit engagement with the basket handle 320. The Curved portion here may be implemented in the form of a spiral positioned at an end of the handle body 311. The spiral presses against the end of the basket handle 320 to removably affix the lid handle 310 with the basket handle 320.

As shown in FIGS. 5A, B, E and F, the brew basket 20 may further include an indicator 600. The indicator 600 is used to indicate that the brew basket 20 is present in the brewing chamber 92 of the brewing machine 90. For example, the indicator 600 may be situated underneath the handle 300 and may include a magnet. Correspondingly, the brewing machine 90 may have a sensor (not shown), which can sense the presence of the indicator 600 at a proper position. In this exemplary case, the sensor can sense the magnetic field. When the brew basket 20 is installed in the brewing chamber 92, the magnet of the indicator 600 is correspondingly positioned at a region where the sensor of the brewing machine 90 can detect the presence of the indicator 600. For example, the change of the magnetic field caused by the magnet can be detected by the sensor, and indicate that the brew basket 20 is installed. As such, the brewing machine 90 can tell whether the installed brew basket is a conventional disposable capsule or the brew basket 20. Thereby, the brewing machine can initiate a corresponding brewing procedure for different types of brew baskets- and/or capsules.

In an exemplary implementation, the basket handle 300 may include a compartment 610 underneath the basket handle 320. The compartment 610 may be of a unitary construction with the basket handle 320. Further, the basket handle 300 may further include a cap 620 to cover the compartment 610, so as to cover the indicator 600 in the compartment 610.

Additionally, when the indicator 600 is implemented by a magnet attached to the handle 300, the magnet can help fix the lid handle 310, when it is made of metal, on to the basket handle 320 by attracting the lid handle 310 to the basket handle 320. Alternatively, the indicator 600 can include other types of communication components that can communicate with the brewing machine 90, such that the brewing machine 90 can determine the type of the installed brew basket. For example, the indicator 600 and its corresponding sensor(s) can be implemented by any signal transmitter/transceiver or any detectable component by the brewing machine 90. For example, the brewing machine 90 may include a RFID receiver, a proximity sensor, capacitive, inductive, magnetic, or optical sensor. Correspondingly, the indicator 600 may include an RFID, an image (for optical sensor), a metal piece (for proximity, capacitive, or inductive sensors). It should be noted that the implementation of the indicator 600 and the corresponding handle design can be applied on the brew basket 10 as described in FIGS. 1-3.

As shown in FIGS. 5A, B, and D, a hinge 400 includes a flange 420, and the flange 420 extends upwardly. Thereby, a valley 430 is located between a crest 510 (as shown in FIG. 5C) and the flange 420. The valley 430 helps guide the lid 200 to pivot about the hinge 400. When the lid 200 pivots about the hinge 400, an upper portion of the basket body 100 over the slit 410 is positioned in the valley 430 and/or between the crest 510 and the flange 420. Further, because the flange 420 in this implementation is angled, this design helps a user insert the flange 420 into the slit 410. It should be noted that the angled flange 420 extending upwardly here can be applied to the brew basket 10 as described in FIGS. 1-3.

Moreover, as shown in FIGS. 5B and C, the elastomeric second layer 211 in this implementation may have a different profile as compared to the embodiment in FIGS. 1-3. Generally, the thickness of the elastomeric second layer 211 gradually increases from the center of the lid 200 to the periphery of the lid 200. The periphery of the elastomeric second layer 211 here includes a side wall 212 facing away from the center of the lid 200. The height of the side wall 212 is greater than the thickness of the adjacent portion of the elastomeric second layer 211. Further, the elastomeric second layer 211 has a valley portion 214 next to the edge of the elastomeric second layer 211, and the thickness of the valley portion 214 is less than the adjacent portions at both sides of the valley portion 214. Additionally, the elastomeric second layer 211 may include an annular lip 216 on the top of the side wall 212 as shown in the circled portion of in FIG. 5C. The annular lip 216 extending upwardly and outwardly from the side wall 212, and it is thinner than the side wall 212. It should be noted that the profile of the elastomeric second layer 211 as shown in FIGS. 5B and C can be implemented on the brew basket 10 as described in FIGS. 1-3.

As shown in FIG. 4, when the brew basket 10 or brew basket 20 of an embodiment of this disclosure is placed in a brewing chamber 92 of a brewing machine 90, the handle 300, such as the basket handle 320 and the lid handle 310, extends beyond the brewing chamber 92 even when a cap 93 of the brewing machine 90 covers the brewing chamber 92. The extended portion beyond the brewing chamber 92 provides a portion for a user to move the brew basket 10. A user may grip the handle 300 without coming in to close contact with brewing chamber 92 and/or surfaces or contents container therein (e.g., heat, steam, moisture, etc.). When the brewing process is performed, the brewing head 91 may inject pressurized liquid via a channel 217 formed by the lid 200 into the basket body 100. The brewing head 91 may optionally enter the channel 217. Further, before the brew basket 10 or brew basket 20 is placed into the brewing chamber 92, the lid 200 may be removable from the basket body 100, such that a user can scoop grounds, such as coffee grinds, from a ground container (not shown) by directly using the brew basket 10 or brew basket 20 without the lid 200 like a scoop. The brewing machine 90 may sense the indicator 600 or may communicate with the brew baskets 10, 20 to determine the type of the installed basket. The embodiments of brew baskets 10 and brew baskets 20 of this disclosure may be reused a plurality of times.

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

One skilled in the art will realize that a virtually unlimited number of variations to the above descriptions are possible, and that the examples and the accompanying figures are merely to illustrate one or more examples of implementations.

It will be understood by those skilled in the art that various other modifications can be made, and equivalents can be substituted, without departing from claimed subject matter. Additionally, many modifications can be made to adapt a particular situation to the teachings of claimed subject matter without departing from the central concept described herein. Therefore, it is intended that claimed subject matter not be limited to the particular embodiments disclosed, but that such claimed subject matter can also include all embodiments falling within the scope of the appended claims, and equivalents thereof.

In the detailed description above, numerous specific details are set forth to provide a thorough understanding of claimed subject matter. However, it will be understood by those skilled in the art that claimed subject matter can be practiced without these specific details. In other instances, methods, devices, or systems that would be known by one of ordinary skill have not been described in detail so as not to obscure claimed subject matter.

Reference throughout this specification to "one embodiment," "an embodiment," "one aspect," or "an aspect" can mean that a particular feature, structure, or characteristic described in connection with a particular embodiment can be included in at least one embodiment of claimed subject matter. Thus, appearances of the phrase "in one embodiment," "an embodiment," "in on aspect," or "an aspect," in various places throughout this specification are not necessarily intended to refer to the same embodiment or to any one particular embodiment described. Furthermore, it is to be understood that particular features, structures, or characteristics described can be combined in various ways in one or more embodiments. In general, of course, these and other issues can vary with the particular context of usage. Therefore, the particular context of the description or the usage of these terms can provide helpful guidance regarding inferences to be drawn for that context.

What is claimed is:

1. A brew basket, comprising:
a basket body, comprising a side wall forming an interior and an opening at an upper edge of the basket body;
a lid having a non-elastomeric first layer, having a first rigidity, and an elastomeric second layer, having a second rigidity lower than the first rigidity; and
a lid handle extending from the lid.

2. The brew basket of claim 1, wherein the first layer forms a hole to receive a neck of the second layer.

3. The brew basket of claim 1, wherein the lid handle comprises a handle body and a first angled portion coupled between the lid and the handle body, wherein the first angled portion spaces the lid from the lid handle in a depth direction of the basket body, when the lid is in a closed position.

4. The brew basket of claim 1, further comprising a basket handle extending from the basket body and positioned on a same side of the basket body as the lid handle, wherein the lid handle and the basket handle are engaged when the lid is in a closed position.

5. The brew basket of claim 4, wherein at least one of the lid handle or the basket handle comprises a fastener to removably fix the lid handle and the basket handle together when the lid is in the closed position.

6. The brew basket of claim 4, wherein the basket handle comprises a groove configured to receive the lid handle when the lid is in the closed position.

7. The brew basket of claim 6, wherein the basket handle further comprises a tooth positioned at an edge of the groove, the tooth configured to removably fix the lid handle in the groove of the basket handle when the lid is in the closed position.

8. The brew basket of claim 4, wherein an end of the lid handle protrudes beyond an end of the basket handle at a side distant from the basket body.

9. The brew basket of claim 8, wherein the lid handle comprises a fastener at the end of the lid handle, the fastener being configured to removably affix the lid handle to the basket handle.

10. A brew basket, comprising:
a basket body, comprising a side wall forming an interior and an opening at an upper edge of the basket body; and
a lid having a non-elastomeric first layer, having a first rigidity, and an elastomeric second layer, having a second rigidity lower than the first rigidity;
wherein a periphery of the elastomeric second layer is configured to wipe a portion of the side wall proximate to the upper edge of the basket body when the lid moves between an open position and a closed position.

11. The brew basket of claim 10, wherein the first layer forms a hole to receive a neck of the second layer.

12. The brew basket of claim 11, wherein at least a portion of the second layer sandwiches a periphery of the hole.

13. The brew basket of claim 12, wherein the second layer forms a channel within the hole of the first layer to receive a brewing head of a brewing machine.

14. The brew basket of claim 10, wherein the second layer surrounds the first layer.

15. The brew basket of claim 14, wherein the second layer and the first layer are co-planar when the lid is in the open position.

16. The brew basket of claim 10, wherein the first layer stacks upon the second layer.

17. A brew basket, comprising:
a basket body, comprising a side wall forming an interior and an opening at an upper edge of the basket body, wherein a cross-sectional area of the basket body at the opening decreases in a depth direction of the basket body; and
a lid having an elastomeric periphery sized and shaped to wipe a portion of the side wall proximate to the upper edge of the basket body when the lid moves between an open position and a closed position,
wherein a rate of decrease in the cross-sectional area at an upper portion of the basket body is larger than a rate of decrease in the cross-sectional area at a lower portion of the basket body.

18. The brew basket of claim 17, wherein the lid has a non-elastomeric first layer, having a first rigidity, and an elastomeric second layer, having a second rigidity lower than the first rigidity.

19. The brew basket of claim 17, wherein the elastomeric periphery of the lid is deformed when the lid is moved from the open position to the closed position.

20. The brew basket of claim 17, wherein an area of the lid in the open position is greater than a smallest portion of a cross-sectional area of the upper portion.

* * * * *